United States Patent
Wang et al.

(10) Patent No.: US 11,632,240 B2
(45) Date of Patent: Apr. 18, 2023

(54) ANONYMOUS DISCLOSE AND MANY-TO-MANY RECOGNITION SYSTEM BASED ON BLOCKCHAIN AND IDENTITY CONFIRMATION ALLOWANCE AND METHOD THEREOF

(71) Applicant: Skychain CO., LTD., Taipei (TW)

(72) Inventors: Chen-Hsuan Wang, Taipei (TW); Jiann-Min Yang, Taipei (TW); Scott Miau, Taipei (TW)

(73) Assignee: Skychain CO., LTD., Taipei (TW)

( * ) Notice: Subject to any disclaimer, the term of this patent is extended or adjusted under 35 U.S.C. 154(b) by 0 days.

(21) Appl. No.: 17/348,730

(22) Filed: Jun. 15, 2021

(65) Prior Publication Data
US 2022/0200786 A1    Jun. 23, 2022

(30) Foreign Application Priority Data
Dec. 22, 2020    (TW) .................................. 109145457

(51) Int. Cl.
*H04L 9/06* (2006.01)
*H04L 9/08* (2006.01)
*H04L 9/00* (2022.01)

(52) U.S. Cl.
CPC ............ *H04L 9/0643* (2013.01); *H04L 9/085* (2013.01); *H04L 9/0819* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,542,115 B1* | 1/2020 | Marquardt | H04L 63/062 |
| 2018/0173906 A1* | 6/2018 | Rodriguez | G06Q 40/00 |
| 2018/0176017 A1* | 6/2018 | Rodriguez | H04L 63/20 |
| 2018/0181964 A1* | 6/2018 | Zagarese | G06Q 20/40145 |
| 2020/0034945 A1* | 1/2020 | Soundararajan | G06T 1/0021 |
| 2021/0243193 A1* | 8/2021 | Padmanabhan | G06Q 10/10 |

* cited by examiner

*Primary Examiner* — Sanchit K Sarker
(74) *Attorney, Agent, or Firm* — Chih Feng Yeh; Huntington IP Consulting Co., Ltd.

(57) ABSTRACT

An anonymous disclose and many-to-many recognition system based on blockchain and identity confirmation allowance and a method thereof are disclosed. In the system, an exposing host generates a one-time address and encrypt the disclosure data into the encrypted data, write the encrypted data into the blockchain; an identity confirmation host generates a valid flag, and an announcement host decrypts the encrypted data to generate a corresponding receipt flag, and garbles a correspondence between the decrypted disclosure data and the corresponding one-time address, to generate and write a shuffled recognition announcement to a blockchain, so that when the exposing host detects the presence of the self-owned disclosure data and one-time address in the shuffled recognition announcement, the exposing host writes a recognition flag into the blockchain. Therefore, the technical effect of improving anonymity and allowing identity confirmation can be achieved.

10 Claims, 7 Drawing Sheets

ANONYMOUS DISCLOSE AND MANY-TO-MANY RECOGNITION SYSTEM BASED ON BLOCKCHAIN AND IDENTITY CONFIRMATION ALLOWANCE AND METHOD THEREOF

CROSS-REFERENCE TO RELATED APPLICATIONS

The present application is based on, and claims priority from TAIWAN patent application Serial Numbered 109145457 filed on Dec. 22, 2020, the disclosure of which is hereby incorporated in its, entirety.

BACKGROUND

1. Technical Field

The present invention relates to an anonymous disclose and many-to-many recognition system and a method thereof, and more particularly to an anonymous disclose and many-to-many recognition system based on blockchain and identity confirmation allowance and a method thereof.

2. Related Art

In recent years, with the popularity and vigorous development of blockchain, various blockchain applications have sprung up, for example, the blockchain is often applied in voting or poll applications because of undeniable and hard-to-tamper characteristics.

Generally, in conventional voting or polling with blockchain, addresses of voters are completely recorded in the blockchain, but when the blockchain application becomes popular, the anonymous effect for the original address become weaker; for example, as the usage rate of a certain address increases, an analyst is able to perform analysis for single address to analyze the user using the certain address, so as to obtain the user's choices, interests and orientations, etc. In a certain application, if the real identity corresponding to the certain address is known, the certain address no longer has anonymity, and the previous unnamed choices become named choices.

In view of above-mentioned problem, some manufacturers have proposed technical solution to encode and encrypt data content (such as votes or polls) by hashing and key encrypting manner, so that the information published on the blockchain still maintains a considerable degree of anonymity. However, if the key used in this technical solution is stolen, the thief can use the key to try various hash functions with brute force testing, so as to perform decryption and hash collision to obtain data content. The above-mentioned technical solution still has the problem of poor anonymity. In addition, many applications (such as anonymous voting or anonymous polls) require anonymous features, but a scheme of verifying the authenticity of the identity is also required in practice in order to avoid falsification. In conventional methods, the authentication is often performed only in the initial stage or when the voting is completed, so there is an interval in which data is not transparent.

Therefore, what is needed is to develop an improved solution to solve the problem that the anonymity and identity confirmation allowance are unable to perform without compromising.

SUMMARY

An objective of the present invention is to provide an anonymous disclose and many-to-many recognition system based on blockchain and identity confirmation allowance and a method thereof, so as to solve the convention technical problem.

In order to achieve the objective, the present invention provides an anonymous disclose and many-to-many recognition system based on blockchain and identity confirmation allowance, and the system includes an exposing host, an identity confirmation host and an announcement host.

The exposing host is configured to transmit a one-time address and use an announcement-end public key to encrypt disclosure data to generate encrypted data, and deploy the encrypted data based on the one-time address, to write the encrypted data into a blockchain. When the exposing host detects presence of the disclosure data and the one-time address in a shuffled recognition announcement in the blockchain, the exposing host uses the self-owned one-time address to write a recognition flag into the blockchain, so as to recognize that the self-owned disclosure data exists in the shuffled recognition announcement. The identity confirmation host is configured to receive the one-time address from the exposing host. When detecting that the encrypted data is written into the blockchain from the one-time address, the identity confirmation host writes a valid flag corresponding to the encrypted data into the blockchain, so as to prove that the encrypted data is from the received one-time address. The announcement host is configured to load the encrypted data from the blockchain when detecting the valid flag and the corresponding encrypted data in the blockchain, and use an announcement-end private key to decrypt the encrypted data, to obtain the disclosure data and the corresponding one-time address, and write a receipt flag corresponding to the encrypted data into the blockchain. When the announcement host obtains the disclosure data and the corresponding one-time address, the announcement host garbles a correspondence between the disclosure data and the one-time address to generate a shuffled recognition announcement, and deploy the shuffled recognition announcement on the blockchain, wherein the shuffled recognition announcement comprises the disclosure data and the one-time address between which correspondence is garbled, wherein the exposing host, the identity confirmation host and the announcement host are connected to each other through a blockchain network as well as comprised a computer readable storage device and one or more integrated circuit chip for executing a plurality of computer instructions stored on the computer readable storage device.

In order to achieve the objective, the present invention further provides an anonymous disclose and many-to-many recognition method based on blockchain and identity confirmation allowance, and the anonymous disclosure and many-to-many recognition method is applied to a blockchain network including a plurality of exposing hosts, an identity confirmation host and an announcement host, and the method comprises steps of: using the exposing host to transmit a one-time address to the identity confirmation host, and using an announcement-end public key to encrypt disclosure data to generate encrypted data, and deploying the encrypted data based on the one-time address, so as to write the encrypted data into a blockchain; when the identity confirmation host detects that the encrypted data is written into the blockchain the one-time address, using the identity confirmation host to write a valid flag corresponding to the encrypted data into the blockchain, to prove that the encrypted data is from the received one-time address; when the announcement host detects presence of the valid flag and the corresponding encrypted data in the blockchain, using the announcement host to load the encrypted data from the blockchain and use an announcement-end private key to decrypt the encrypted data, to obtain the disclosure data and the corresponding one-time address and write a receipt flag corresponding to the encrypted data into the blockchain; when the announcement host obtains the disclosure data and the corresponding one-time address, using the announcement host to garble a correspondence between the disclosure data and the one-time address, to generate a shuffled recognition announcement, and deploy the shuffled recognition announcement on the blockchain, wherein the shuffled recognition announcement comprises the disclosure data and the one-time address between which the correspondence is garbled; and when each of the plurality of exposing hosts detects presence of the self-owned disclosure data and the one-time address in the shuffled recognition announcement, using each of the plurality of exposing hosts to write a recognition flag into the blockchain based on the self-owned one-time address, to recognize that the self-owned disclosure data exists in the shuffled recognition announcement.

According to above-mentioned system and method of the present invention, the difference between the conventional technology and the present invention is that, in the present invention, the exposing host generates the one-time address and encrypt the disclosure data into the encrypted data, and writes the encrypted data into the blockchain; the identity confirmation host generates the valid flag, and the announcement host decrypts the encrypted data to generate the corresponding receipt flag, and garbles the correspondence between the decrypted disclosure data and the corresponding one-time address, to generate and write the shuffled recognition announcement to the blockchain, so that when the exposing host detects presence of the self-owned disclosure data and the one-time address in the shuffled recognition announcement, the exposing host writes the recognition flag into the blockchain. Therefore, the technical effect of improving anonymity and allowing identity confirmation can be achieved.

BRIEF DESCRIPTION OF THE DRAWINGS

The structure, operating principle and effects of the present invention will be described in detail by way of various embodiments which are illustrated in the accompanying drawings.

DETAILED DESCRIPTION

Figure 1:
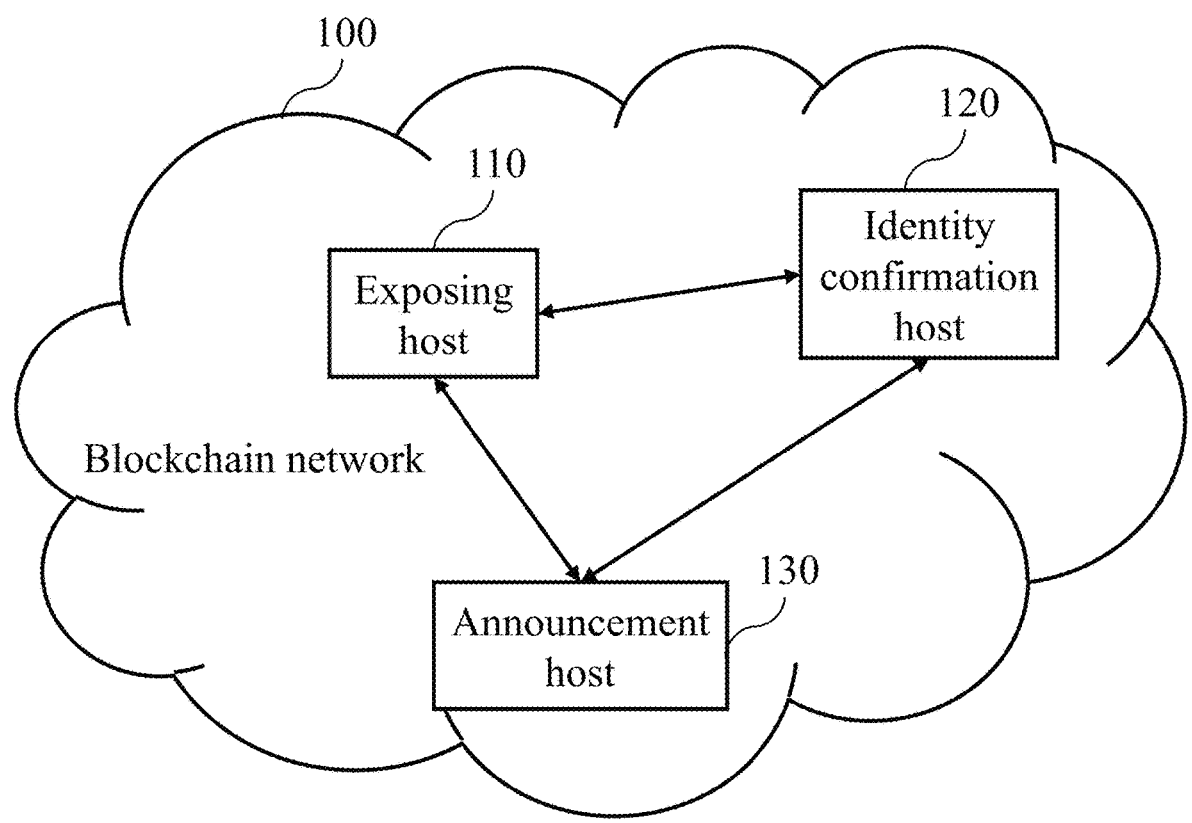
FIG. 1 is a system block diagram of an anonymous disclose and many-to-many recognition system based on blockchain and identity confirmation allowance, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The application environment of the present invention is described before illustration of the anonymous disclose and many-to-many recognition system based on blockchain and identity confirmation allowance and a method of the present invention. The present invention is applied in blockchain network environment, and a blockchain network includes an exposing host, an identity confirmation host, and an announcement host. In practice, the hosts can be regarded as nodes of the blockchain network, and each of the hosts has a blockchain for recording the same content. Besides, a preset smart contract also exists in the blockchain, and the smart contract means a computer program for driving execution commands based on a predetermined condition and transferred information, and particularly, the smart contract is programmed with programming language, such as Solidity, Serpent, LLL, EtherScript, or Sidechain, and the smart contract can include different functions, events and parameter states, and the events can be triggered and parameter states can be changed by executing program.

The anonymous disclose and many-to-many recognition system based on blockchain and identity confirmation allowance and a method thereof of the present invention will hereinafter be described in more detail with reference to the accompanying drawings. Please refer to FIG. 1, which is a system block diagram of an anonymous disclose and many-to-many recognition system based on blockchain and identity confirmation allowance, according to the present invention. As shown in FIG. 1, the system includes an exposing host 110, an identity confirmation host 120, and an announcement host 130. The exposing host 110 is configured to transmit a one-time address to the identity confirmation host 120, use an announcement-end public key to encrypt disclosure data to generate encrypted data, and deploy the encrypted data based on the one-time address, so as to write the encrypted data into a blockchain. When the exposing host 110 detects presence of the self-owned disclosure data and one-time address in a shuffled recognition announcement in the blockchain, the exposing host 110 uses the self-owned one-time address to write a recognition flag into the blockchain, so as to recognize that the self-owned disclosure data exists in the shuffled recognition announcement. In actual implementation, the announcement-end public key is a public key obtained from the announcement host 130 in advance. The one-time address can be generated by the exposing host 110 through a hierarchical deterministic wallet based on a main secret key serving as a seed. In practice, the identity confirmation host 120 pre-stores a main address or identity data, so that when the identity confirmation host 120 completes authentication for the exposing host 110 based on the main address or the identity data and receives the one-time address from the exposing host 110, the identity confirmation host 120 can create a correspondence between the one-time address and the main address or the identity data, to allow to identify the user's real identity according to the correspondence. Furthermore, the encryption and decryption can be performed with salt data defined in cryptography, and the salt data is used as a part of the encrypted data, so that after the announcement host 130 loads the encrypted data from the blockchain, the announcement host 130 can decrypt the encrypted data to obtain the disclosure data by using an announcement-end private key, to improve the overall security level.

The identity confirmation host 120 receives the one-time address from the exposing host 110. When detecting that the encrypted data is written into the blockchain from the one-time address, the identity confirmation host 120 writes a valid flag, which corresponds to the encrypted data, into the blockchain, so as to prove that the encrypted data is from the received one-time address. In actual implementation, as described above, the exposing host 110 transmits the one-time address to the identity confirmation host 120, and the identity confirmation host 120 confirms whether the exposing host 110 is qualified before detection, for example, the identity confirmation host 120 can perform confirmation by main address comparison, real-name authentication or similar manner. When the exposing host 110 is qualified, the identity confirmation host 120 detects whether the encrypted data is written to the blockchain based on the one-time address. Furthermore, the valid flag generated by the identity confirmation host 120 can be recorded in format of JSON or other similar format, the following content is an example of a valid flag:

⌈{

A transaction hash value of encrypted disclosure data: "0x04542 . . . ",

Whether the source address is valid: true}₁, or a piece of record is added in the smart contract:

⌈[the disclosure data record number: 13; whether the source address is valid: false]₁

When the announcement host 130 detects presence of the valid flag and the corresponding encrypted data in the blockchain, the announcement host 130 loads the encrypted data from the blockchain, and use the announcement-end private key (that is, the private key of the announcement host 130) to decrypt the encrypted data to obtain at least one pieces of disclosure data and the corresponding one-time address. Next, the announcement host 130 writes a receipt flag corresponding to the encrypted data into the blockchain. Furthermore, when the announcement host 130 obtains the disclosure data and the corresponding one-time address, the announcement host 130 garbles a correspondence between the disclosure data and the one-time address, to generate the shuffled recognition announcement. It is to be particularly noted that the announcement host 130 still holds the disclosure data and the one-time address with the original correspondence. Next, the announcement host 130 deploys the shuffled recognition announcement on the blockchain, the shuffled recognition announcement includes the disclosure data and the one-time address with garbled correspondence, that is, the content of the shuffled recognition announcement includes a set of the disclosure data and a set of the one-time addresses but does not include the original correspondence between the set of the disclosure data and the set of the one-time addresses. The manner of garbling the correspondence can be implemented by executing a garble function to garble, disarrange or hide the correspondence between the disclosure data and the one-time address. For example, the sequence of the disclosure data and the one-time address in the shuffled recognition announcement can be randomly sorted or arranged, so that there is no longer a correspondence between the disclosure data and the one-time address in the shuffled recognition announcement, and there is no way to obtain the correspondence. In fact, the announcement-end private key and the announcement-end public key correspond to each other and are the same key pair of the announcement host 130. The private key and the public key can be implemented by symmetric or asymmetric encryption technology. Furthermore, the disclosure data includes a unique identifier configured to allow the exposing host 110 to identify self-owned disclosure data based on the identifier when the disclosure data is announced in the shuffled recognition announcement. In actual implementation, the receipt flag generated by the announcement host 130 is recorded in format of JSON or other similar format, the following content is an example of a valid flag:

⌈{

A transaction hash value of encrypted disclosure data: "0x04542 . . . ",

Whether the decryption is successful: false

}₁, or a piece of record is added in the smart contract:

⌈[disclosure data record number: 17, and whether decryption is successful: true]₁

The valid flag is mainly used to record whether the source address is valid, and the receipt flag is mainly used to record whether the decryption is successful. Besides, in actual implementation, the shuffled recognition announcement is a smart contract which records the disclosure data and the corresponding one-time address, and the exposing host 110 writes the recognition flag through the smart contract, the shuffled recognition announcement can be data content of a blockchain transaction, and the exposing host 110 is allowed to write an independent transaction representing the recognition flag, and note the corresponding relationship in the data content, such as the hash value of the shuffled recognition announcement transaction. Furthermore, the amount of the disclosure data may be unequal to the amount of the exposing host 110, for example, an exposing host 110 generates multiple pieces of disclosure data, so the weighting relationship can be noted in the smart contract of the shuffled recognition announcement; for example, in a weighted voting application, a certain exposing host 110 generates three voting records, and the one-time address of the certain exposing host 110 can recognize three votes, or the same exposing host 110 generate multiple one-time identities to vote individually through the identity confirmation host 120. Furthermore, when the disclosure data is unrecognized, the announcement host deploys the shuffled recognition announcement again based on all disclosure data having the recognition flags until all pieces of the disclosure data have the corresponding recognition flags. In other words, when the amount of the exposing host 110 recognizing the shuffled recognition announcement is insufficient, the announcement host 130 can delete the one-time address and the disclosure data which are not recognized, and deploy the shuffled recognition announcement again until all pieces of the disclosure data are recognized. Besides, the shuffled recognition announcement can be divided into multiple parts, for example, there are numerous exposing hosts 110 and it is difficult for the all exposing hosts 110 to recognize the same shuffled recognition announcement. For example, in the anonymous voting application, the shuffled recognition announcement can be divided into multiple parts which represent multiple polling places respectively, and final number of votes is a sum of votes of all polling places.

It is to be particularly noted that, in actual implementation, the hosts/nodes of the present invention can be implemented by various manners, including hardware or combination of software and hardware, for example, in an embodiment, the host/node can be implemented by software and hardware, or hardware. Furthermore, the present invention can be implemented fully or partly based on hardware, for example, one or more host/node of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer readable storage device which records computer readable program instructions, and the processor can execute the computer readable program instructions to implement concepts of the present invention. The computer readable storage device can be a tangible apparatus for holding and storing the instructions executable of an instruction executing apparatus. Computer readable storage device can be, but not limited to electronic storage apparatus, magnetic storage apparatus, optical storage apparatus, electromagnetic storage apparatus, semiconductor storage apparatus, or any appropriate combination thereof. More particularly, the computer readable storage device can include a hard disk, an RAM memory, a read-only-memory, a flash memory, an optical disk, a floppy disc or any appropriate combination thereof, but this exemplary list is not an exhaustive list. The computer readable storage device is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer readable storage device to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer readable storage device of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2A:
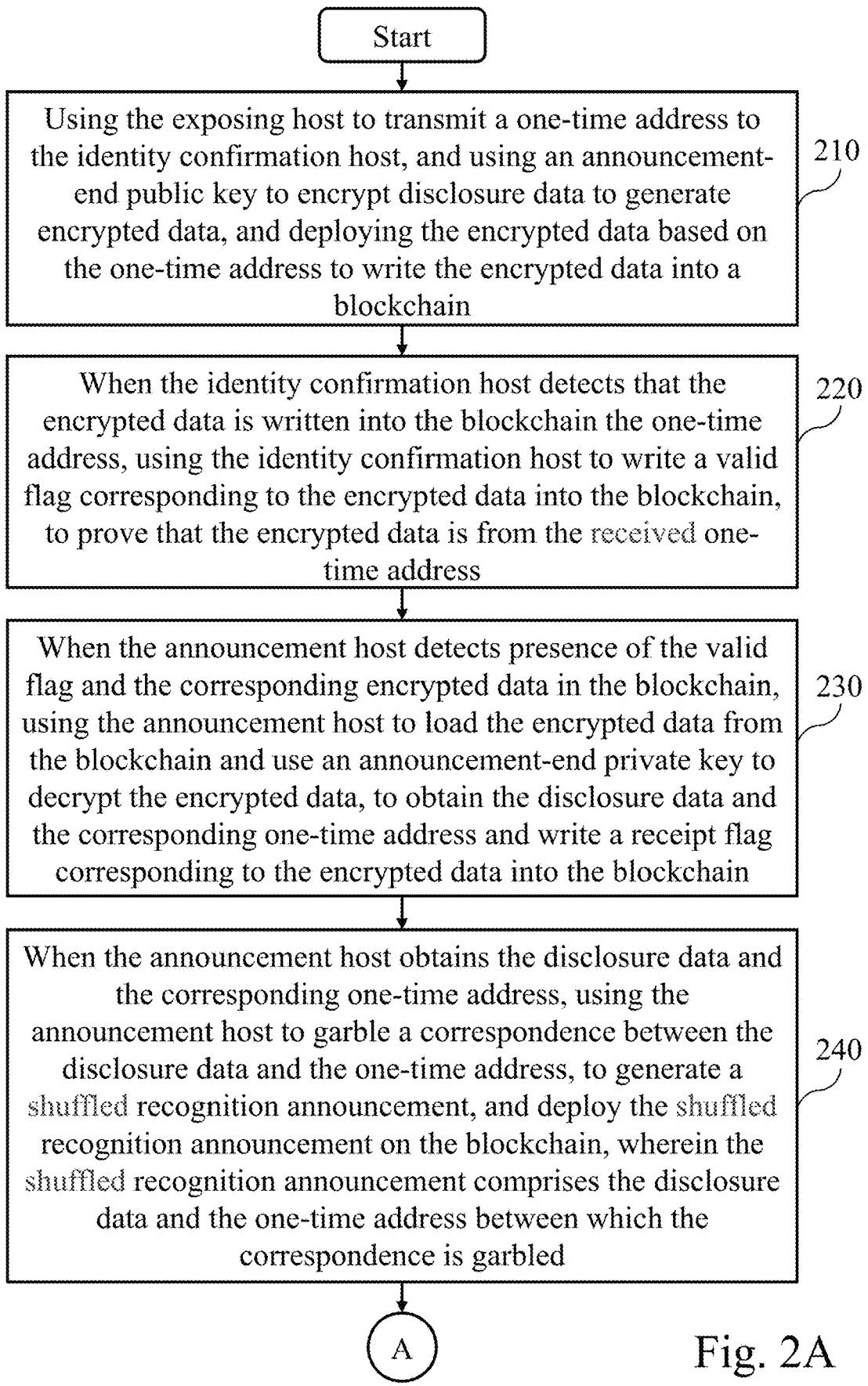
FIGS. 2A and 2B are flowcharts of an anonymous disclose and many-to-many recognition method based on blockchain and identity confirmation allowance, according to the present invention.
Figure 2B:
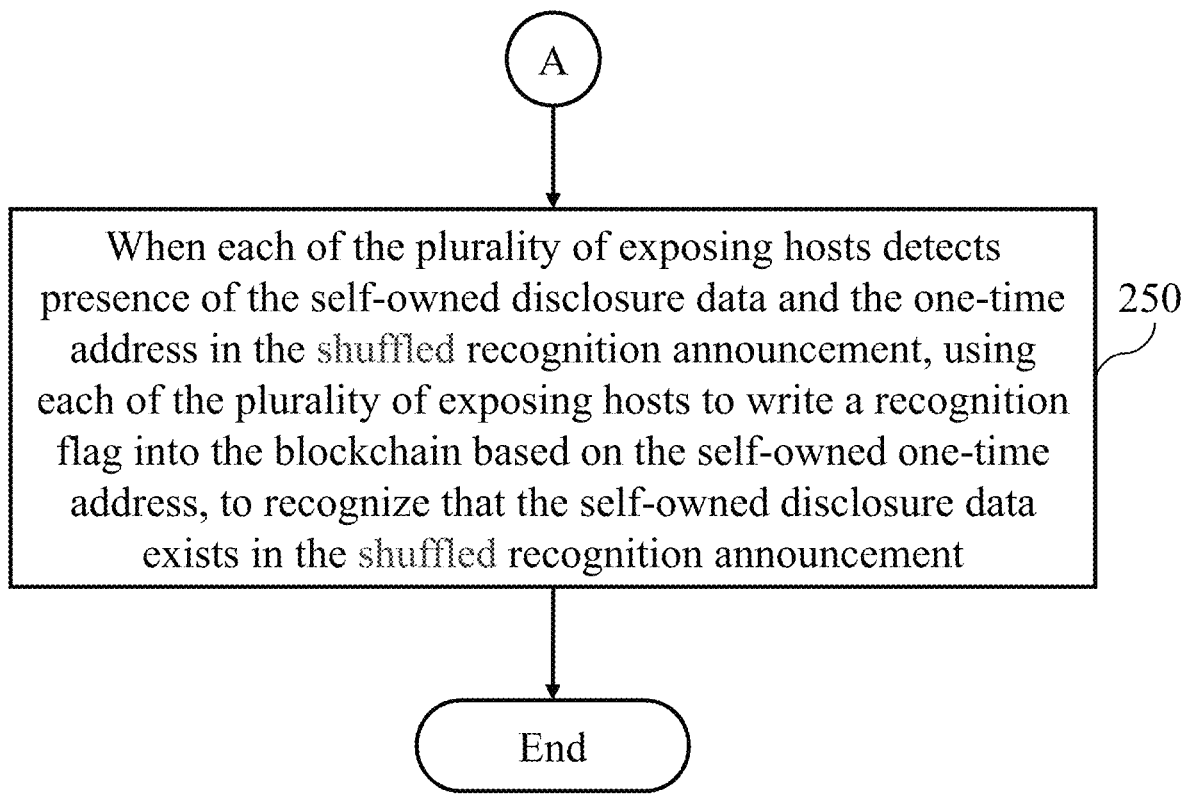

Please refer to FIGS. 2A and 2B, which are flowcharts of an anonymous disclose and many-to-many recognition method based on blockchain and identity confirmation allowance, according to the present invention. The method is applied to a blockchain network 100 including a plurality of exposing hosts 110, an identity confirmation host 120 and an announcement host 130, and the method includes steps 210 to 250. In a step 210, the exposing host 110 transmits a one-time address to the identity confirmation host 120, and use an announcement-end public key to encrypt disclosure data to generate encrypted data, and deploy the encrypted data based on the one-time address, so as to write the encrypted data into a blockchain. In a step 220, when the identity confirmation host 120 detects that the encrypted data is written into the blockchain the one-time address, the identity confirmation host 120 writes a valid flag corresponding to the encrypted data into the blockchain, to prove that the encrypted data is from the received one-time address. In a step 230, when the announcement host 130 detects presence of the valid flag and the corresponding encrypted data in the blockchain, the announcement host 130 loads the encrypted data from the blockchain and uses an announcement-end private key to decrypt the encrypted data, to obtain the disclosure data and the corresponding one-time address and write a receipt flag corresponding to the encrypted data into the blockchain. In a step 240, when the announcement host 130 obtains the disclosure data and the corresponding one-time address, the announcement host 130 garble a correspondence between the disclosure data and the one-time address, to generate a shuffled recognition announcement, and deploy the shuffled recognition announcement on the blockchain, wherein the shuffled recognition announcement comprises the disclosure data and the one-time address between which the correspondence is garbled. In a step 250, when each exposing host 110 detects presence of the self-owned disclosure data and the one-time address in the shuffled recognition announcement, each exposing host 110 writes a recognition flag into the blockchain based on the self-owned one-time address, to recognize that the self-owned disclosure data exists in the shuffled recognition announcement. Through aforementioned steps, the exposing host 110 can generate the one-time address and encrypt the disclosure data into the encrypted data, and write the encrypted data into the blockchain; the identity confirmation host 120 generates a valid flag, and the announcement host 130 decrypts the encrypted data to generate the corresponding receipt flag, and garbles the correspondence between the decrypted disclosure data and the corresponding one-time address, to generate and write a shuffled recognition announcement to a blockchain, so that when the exposing host 110 detects the presence of the self-owned disclosure data and one-time address in the shuffled recognition announcement, the exposing host 110 can write a recognition flag into the blockchain. Therefore, only the announcement host 130 is able to obtain the disclosure data from the encrypted data in the blockchain; the identity confirmation host 120 knows the correspondence between the one-time address and the real identity, but the identity confirmation host 120 is unable to obtain the correspondence between the one-time address and the disclosure data; the announcement host 130 knows the correspondence between the one-time address and the disclosure data, but the announcement host 130 is unable to obtain the correspondence between the one-time address and real identity. Therefore, the present invention can achieve anonymity and identity confirmation allowance without compromising.

The embodiment of the present invention will be described in the following paragraphs with reference to FIGS. 3A to 3D. As shown in FIGS. 3A to 3D, which are schematic views of anonymous voting, polls and lottery draws, in application of the present invention, respectively. In anonymous voting application, the exposing host 110 can be regarded as a voter, the identity confirmation host 120 can be regarded as an election staff in each polling place, and the announcement host 130 can be regarded as an election center, the disclosure data is the voter's vote. The operations, information confirmation, and writing behaviors of the hosts can be automated by device or system, such as IoT voting machine or dedicated mobile program for voting. The steps of anonymous voting processes are described in the following paragraphs.

Figure 3A:
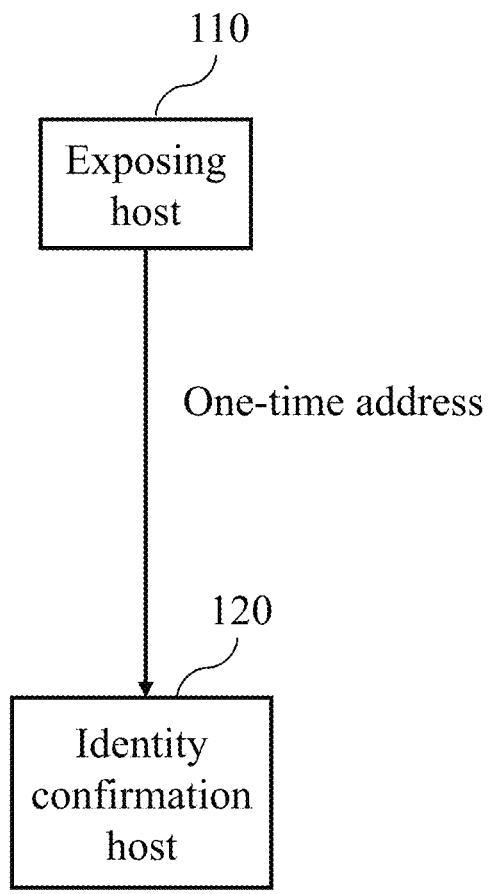
FIGS. 3A to 3D are schematic views of anonymous voting, poll and lottery draw applications, according to the present invention, respectively.

In a first step, as shown in FIG. 3A, the exposing host 110 transmits the one-time address, which is to be used, to the identity confirmation host 120. This step is equivalent to the situation in which the voter informs the election staff of the one-time address to be used after the voter's identity is authenticated in the polling place.

Figure 3B:
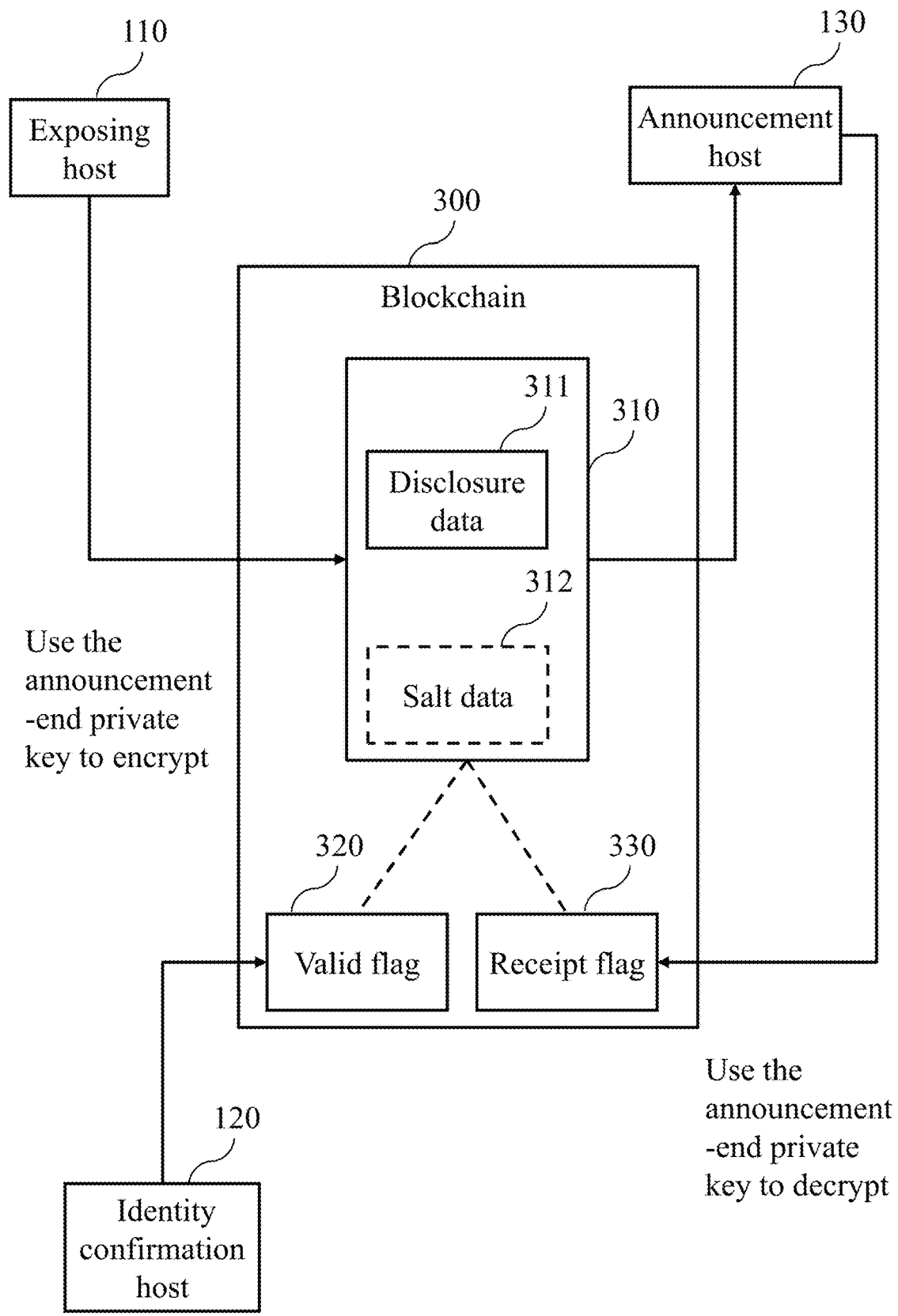

In a second step, as shown in FIG. 3B, the exposing host 110 uses an announcement-end public key to encrypt the disclosure data 311 to generate the encrypted data 310, and deploy the encrypted data 310 based on the one-time address, to write the encrypted data into a blockchain 300. In actual implementation, in order to improve data security, the salt data 312 defined in cryptography can be used as a part of the encrypted data 310 for further decryption. This step is equivalent to the situation in which the voter uses a public key (that is, the announcement-end public key) of the election center to encrypt his voting content thereof including an identifier, and the encryption result is written into a smart contract (such as a polling contract). Besides, the voting content also includes a weight for weighted voting effect, and one exposing host 110 can generate more than one voting content.

In a third step, when the identity confirmation host 120 detects that the encrypted data 310 is written into the blockchain 300 from the one-time address, the identity confirmation host 120 writes a valid flag 320 corresponding to the encrypted data 310 into the blockchain 300, to prove that the encrypted data 310 is from the one-time address. The third step is equivalent to the situation in which the election staff in each polling place observes that the voter's encryption result (that is, the encrypted data 310) is written into the polling contract, and the election staff writes the corresponding valid flag into the polling contract.

In a fourth step, when the announcement host 130 detects the presence of the valid flag 320 and the corresponding encrypted data 310 in the blockchain 300, the announcement host 130 loads the encrypted data 310 from the blockchain 300, and uses the announcement-end private key to decrypt the loaded encrypted data 310 to obtain the disclosure data 311 and the corresponding one-time address, and writes a receipt flag 330 corresponding to the encrypted data 310 into the blockchain 300. The fourth step is equivalent to the situation in which when the election center observes presence of the valid flag and the corresponding encryption result, the election center obtains the encryption result from the blockchain and uses a private key (that is, the announcement-end private key) of the election center to decrypt the encryption result to obtain the voting content and the identifier, and write corresponding valid flag into the polling contract.

Figure 3C:
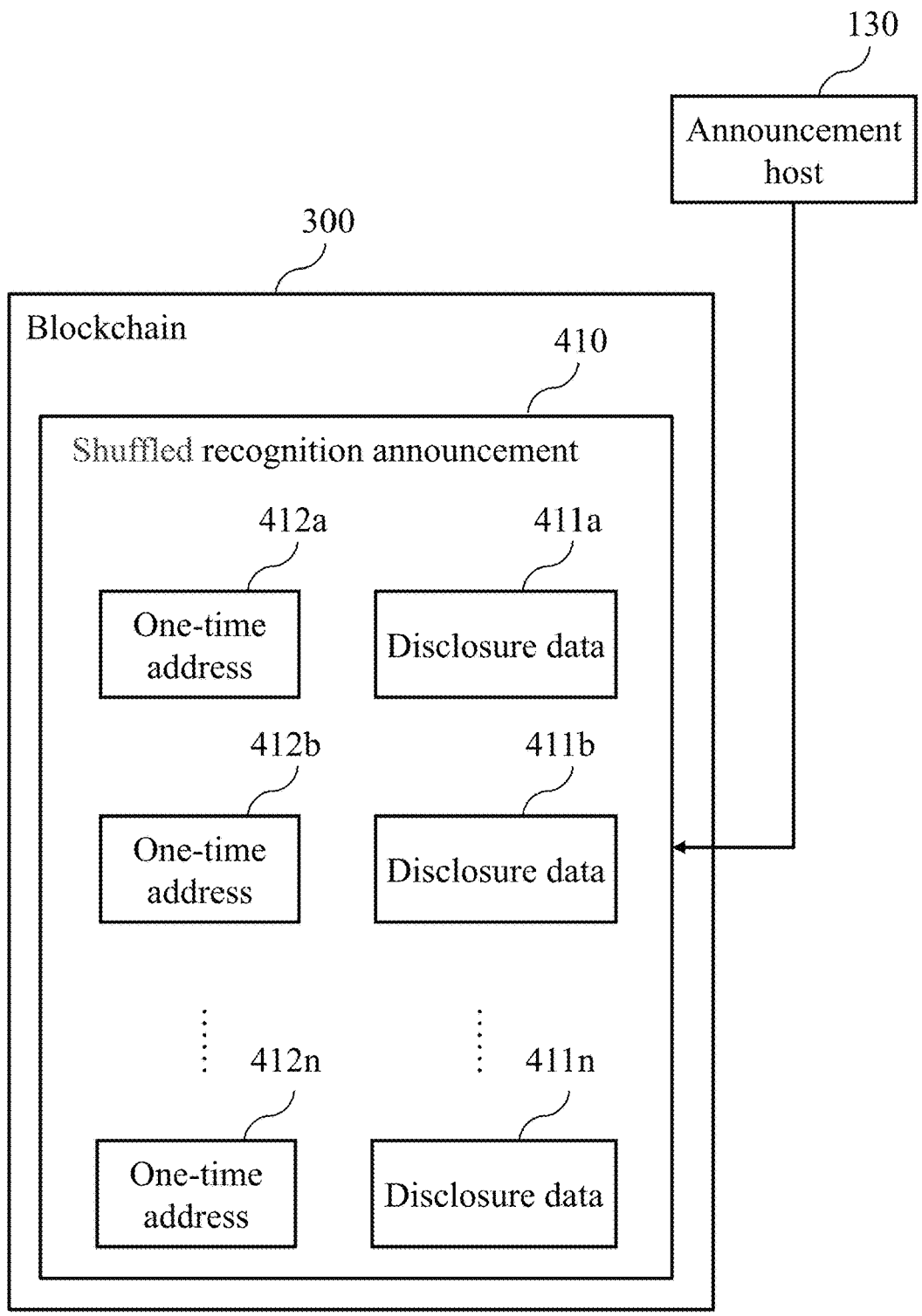

In a fifth step, as shown in FIG. 3C, when the announcement host 130 obtains the disclosure data (411a-411n) and the corresponding one-time addresses (412a-412n), the announcement host 130 garbles the correspondence between the disclosure data (411a-411n) and the one-time addresses (412a-412n), and deploys a shuffled recognition announcement 410 to the blockchain 300. The shuffled recognition announcement 410 includes the disclosure data (411a-411n) and the one-time address (412a-412n) with garbled correspondence, that is, the correspondence between the disclosure data (411a-411n) and the one-time address (412a-412n) recorded in the shuffled recognition announcement 410 has been garbled already. The step is equivalent to the situation in which the election center collects all voters' voting contents including the identifiers) to deploy the public ticket inspection contract (the shuffled recognition announcement 410). All voting contents and all voter's one-time addresses are published, but the correspondence between the all voting contents and all voter's one-time addresses are not published. In practice, the deployed public ticket inspection contract can integrate or separate one or more voting contents.

Figure 3D:
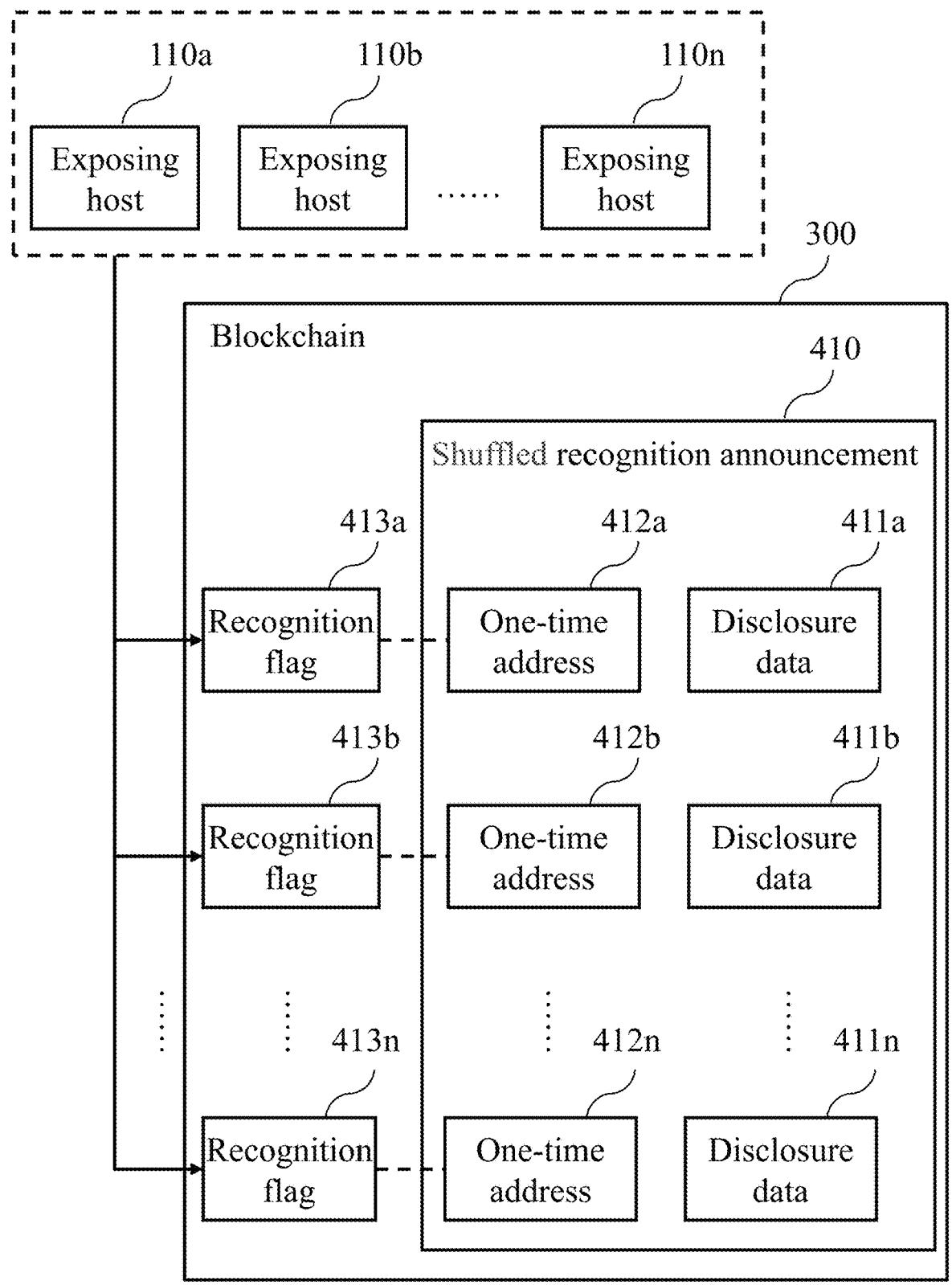

In a sixth step, as shown in FIG. 3D, when each of exposing host (110a-110n) detects presence of the self-owned disclosure data and the one-time address in the shuffled recognition announcement 410, the exposing host uses the self-owned one-time address to write a recognition flag into the blockchain 300, so as to recognize that the self-owned disclosure data exists in the shuffled recognition announcement 410. The step is equivalent to the situation in which each voter confirms his voting content in the public ticket inspection contract according to the identifier, and writes the recognition flag into the public ticket inspection contract.

Through above-mentioned steps, after all voters writes the recognition flags into the public ticket inspection contract, it indicates that each vote recorded in the public ticket inspection contract are recognized by the corresponding voter, and the public ticket inspection contract is valid; in contrast, when not all voters writes recognition flags into the public ticket inspection contract, the election center can cancel the record and deploy the public ticket inspection contract again, that is, the election center deploys the cancelled record in other public ticket inspection contract again until the re-deployed record is recognized, or the re-deployed record is regarded as invalid vote after the voting process is ended. The election center can deploy multiple polling contracts and multiple public ticket inspection contracts, collect all valid public ticket inspection contracts, and use the statistics of the voting contents as the voting result. In this example, the announcement host 130 is unable to modify the content of the disclosure data, so as to achieve the effect that the exposing host 110 self-checks whether the disclosure data is announced actually. In other words, the vote counting party is unable to falsify the voting result, and every voter can ensure that his vote has been issued during the vote inspection stage, so the above-mentioned process can be called autonomous vote inspection.

In an embodiment of an anonymous poll application, the exposing host 110 can be regarded as an interviewee, the identity confirmation host 120 can be regarded as a third-party authentication agency, the announcement host 130 can be regarded as a poll center, and the disclosure data is interview content (such as the interviewee's voting result). The operations, information confirmation and writing behaviors of the hosts can be automated by device or system; for example, the polling web system or a mobile application. In practice, the anonymous poll application is similar to anonymous voting application, and the difference between these two applications is the roles of the hosts and the contents of disclosure data. The steps of conducting an anonymous poll are described with reference to FIGS. 3A to 3D.

In a first step, as shown in FIG. 3A, the exposing host 110 transmits the one-time address, which is to be used, to the identity confirmation host 120. This step is equivalent to the situation in which the interviewee informs the third party authentication agency of the one-time address, which is to be used, after the interviewee's identity is authenticated by the third party authentication agency.

In a second step, as shown in FIG. 3B, the exposing host 110 uses the announcement-end public key to encrypt the disclosure data 311 (including identifier), to generate encrypted data 310 (including the salt data 312), and deploy the encrypted data 310 based on the one-time address to write the encrypted data 310 into the blockchain 300. The step is equivalent to the situation in which the interviewee uses the public key of poll center (that is, the announcement-end public key), to encrypt the interview content (including identifier) and even encrypt the salt data 312, and then write the encryption result into a transaction in the blockchain.

In a third step, when the identity confirmation host 120 detects that the encrypted data 310 is written into the blockchain 300 from the one-time address, the identity confirmation host 120 writes the valid flag 320 corresponding to the encrypted data 310 into the blockchain 300, to prove that the encrypted data 310 is from the one-time address. The third step is equivalent to the situation in which the third party authentication agency observes that the transaction associated with the interviewee's encryption result (the encrypted data 310) is written into the blockchain 300, so the third party authentication agency writes the valid flag 320 noted with the transaction hash value of the encryption result into the blockchain 300.

In a fourth step, when the announcement host 130 detects the presence of the valid flag 320 and the corresponding encrypted data 310 in the blockchain 300, the announcement host 130 loads the encrypted data 310 from the blockchain 300, and uses the announcement-end private key to decrypt the loaded encrypted data 310 to obtain the disclosure data 311 and the corresponding one-time address, and write the receipt flag 330 corresponding to the encrypted data 310 into the blockchain 300. The step is equivalent to the situation in which the poll center observes the valid flag and the corresponding encryption result, the election center then obtains the encryption result from the blockchain, and uses the private key (the announcement-end private key) of the poll center to decrypt the encryption result to obtain the interview content and the identifier, and write the receipt flag 330 noted with the transaction hash value of the encryption result into the blockchain 300.

In a fifth step, as shown in FIG. 3C, when the announcement host 130 obtains the disclosure data (411*a*-411*n*) and the corresponding one-time address (412*a*-412*n*), the announcement host 130 garbles the correspondence between the disclosure data (411*a*-411*n*) and the one-time address (412*a*-412*n*), and deploys the shuffled recognition announcement 410 to the blockchain 300; the shuffled recognition announcement 410 includes the disclosure data (411*a*-411*n*) and the one-time address (412*a*-412*n*) between which correspondence is garbled. The step is equivalent to the situation in which the poll center collects all signed interview contents (including identifiers) to deploy the public poll announcement (that is, the shuffled recognition announcement 410), and all interview contents and one-time addresses of all interviewees are published, but the correspondence between the voting contents and all voter's one-time addresses are not published. In practice, the number of the deployed public poll announcement can be one or multiple, and when the number of the public poll announcement is one, it indicates that all signed interview contents are integrated in one public poll announcement; when the number of the deployed public poll announcement is multiple, it indicates that the signed interview contents are separated into different public poll announcements.

In a sixth step, as shown in FIG. 3D, when each exposing host detects presence of the self-owned disclosure data and the one-time address in the shuffled recognition announcement 410, each exposing host uses the self-owned one-time address to write the recognition flag (413*a*-413*n*) into the blockchain 300, so as to recognize that the self-owned disclosure data exists in the shuffled recognition announcement 410. The step is equivalent to the situation in which each interviewee confirms his interview content in the public poll announcement according to the identifier, and write the recognition flag noted with the transaction hash value of the public poll announcement into the blockchain.

Therefore, after all interviewees write the recognition flags into the blockchain, it indicates that each interview content in the public poll announcement is recognized by the corresponding interviewee, so the public poll announcement is valid; in contrast, when not all interviewees write the recognition flags, the poll center can cancel the record and deploy the public poll announcement again, that is, the poll center deploys the cancelled interview content in other public poll announcement again until the re-deployed record is recognized, or the cancelled record is regarded as invalid after the poll process is ended. In practice, the poll center can deploy multiple public poll announcements, collect all valid public poll announcements, and use the statistics of the interview contents as a poll result.

In an embodiment of lottery draw application, the exposing host 110 can be regarded as a lottery purchaser, the identity confirmation host 120 can be regarded as a lottery retailer, the announcement host 130 can be regarded as a lottery head office, the disclosure data is the lottery selection number or algorithm weights which are arbitrarily decided or randomly generated. The operations, information confirmation and writing behaviors of the hosts can be automated by device or system, such as the official lottery webpage system or mobile application. The lottery draw application is similar to the anonymous voting or poll application, and steps of conducting lottery draw are described in the following paragraphs with reference to FIGS. 3A to 3D.

In a first step, as shown in FIG. 3A, the exposing host 110 transmits the one-time address, which is to be used, to the identity confirmation host 120. The step is equivalent to the situation in which a lottery purchaser informs the lottery retailer of the one-time address to be used.

In a second step, as shown in FIG. 3B, the exposing host 110 uses the announcement-end public key to encrypt the disclosure data 311 to generate the encrypted data 310, deploys the encrypted data 310 based on the one-time address, and writes the encrypted data into a blockchain 300. The step is equivalent to the situation in which the lottery purchaser uses the lottery head office public key to encrypt the disclosure data (including the lottery selection number, the algorithm weights and the identifier), and writes the encryption result into the current lottery smart contract pre-deployed in the blockchain. Similarly, in order to improve data security, the salt data 312 defined in cryptography can be used in the encryption/decryption process.

In a third step, when the identity confirmation host 120 detects that the encrypted data 310 is written into the blockchain 300 from the one-time address, the identity confirmation host 120 writes the valid flag 320 corresponding to the encrypted data 310 into the blockchain 300, so as to prove that the encrypted data 310 is from the one-time address. The step is equivalent to the situation in which the lottery retailer observes that the encryption result of the lottery purchaser is written into the lottery-purchase smart contract, and the lottery retailer then writes the valid flag, which corresponds to the record, into the current lottery smart contract.

In a fourth step, when the announcement host 130 detects the presence of the valid flag 320 and the corresponding encrypted data 310 in the blockchain 300, the announcement host 130 loads the encrypted data 310 from the blockchain 300, and uses the announcement-end private key to decrypt the loaded encrypted data 310 to obtain the disclosure data 311 and the corresponding one-time address, and write the receipt flag 330 corresponding to the encrypted data 310 into the blockchain 300. The step is equivalent to the situation in which the lottery head office observes presence of the valid flag and the corresponding encryption result, the lottery head office then obtains the encryption result from the blockchain, and uses the announcement-end private key to decrypt the encryption result, to obtain the selection number, the algorithm weights and the identifier of the purchased lottery, and the lottery head office writes the corresponding valid flag into the current lottery smart contract.

In a fifth step, as shown in FIG. 3C, when the announcement host 130 obtains the disclosure data (411a-411n) and the corresponding one-time address (412a-412n), the announcement host 130 garbles the correspondence between the disclosure data (411a-411n) and the one-time address (412a-412n), and deploys the shuffled recognition announcement 410 to the blockchain 300. The shuffled recognition announcement 410 includes the disclosure data (411a-411n) and the one-time address (412a-412n) between which correspondence is garbled. The step is equivalent to the situation in which the lottery head office collects the records (the lottery selection numbers, the algorithm weights and the identifiers of the purchased lotteries) of all lotteries purchased by purchasers, and deploys the shuffled recognition announcement contract. All lottery records and one-time addresses of all purchasers are published, but the correspondence between the voting contents and all voter's one-time addresses are not published.

In a sixth step, as shown in FIG. 3D, when each exposing host detects presence of the self-owned disclosure data and the one-time address in the shuffled recognition announcement 410, each exposing host uses the self-owned one-time address to write the recognition flag into the blockchain 300, so as to recognize that the self-owned disclosure data exists in the shuffled recognition announcement 410. The step is equivalent to the situation in which each lottery purchaser confirms his lottery purchase record in the shuffled recognition announcement contract according to the identifier, and then writes the recognition flag into the shuffled recognition announcement contract.

After all lottery purchasers write the recognition flags into the shuffled recognition announcement contract, the algorithm weights in the lottery records are used to calculate the winning number. When not all lottery purchaser writes the recognition flags into the shuffled recognition announcement contract, the lottery head office can cancel the lottery record which does not have the recognition flag, and deploy the shuffled recognition announcement contract again. The winning numbers are calculated with the algorithm weights provided by the lottery purchaser, so the lottery head office is unable to control the winning number, and the winning number is decided by the algorithm weights, and randomness and recognition flags of the purchasers, so as to achieve the effect of fairness and no falsification.

Therefore, the difference between the conventional technology and the present invention is that, in the present invention, the exposing host generates the one-time address and encrypts the disclosure data into the encrypted data, and writes the encrypted data into the blockchain; the identity confirmation host generates the valid flag, and the announcement host decrypts the encrypted data to generate the corresponding receipt flag, and garbles the correspondence between the decrypted disclosure data and the corresponding one-time address, to generate and write the shuffled recognition announcement to the blockchain, so that when the exposing host detects the presence of the self-owned disclosure data and the one-time address in the shuffled recognition announcement, the exposing host writes the recognition flag into the blockchain. Therefore, the technical solution of the present invention can achieve the technical effect of improving anonymity and allowing identity confirmation.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An anonymous disclosure and many-to-many recognition system based on blockchain and identity confirmation allowance, comprising:
   an exposing host, configured to transmit a one-time address and use an announcement-end public key to encrypt disclosure data to generate encrypted data, and deploy the encrypted data based on the one-time address, to write the encrypted data into a blockchain, wherein when the exposing host detects presence of the disclosure data and the one-time address in a shuffled recognition announcement in the blockchain, the exposing host uses the self-owned one-time address to write a recognition flag into the blockchain, so as to recognize that the self-owned disclosure data exists in the shuffled recognition announcement;
   an identity confirmation host, configured to receive the one-time address from the exposing host, wherein when detecting that the encrypted data is written into the blockchain from the one-time address, the identity confirmation host writes a valid flag corresponding to the encrypted data into the blockchain, so as to prove that the encrypted data is from the received one-time address;

an announcement host, configured to load the encrypted data from the blockchain when detecting presence of the valid flag and the corresponding encrypted data in the blockchain, and use an announcement-end private key to decrypt the encrypted data, to obtain the disclosure data and the corresponding one-time address and write a receipt flag corresponding to the encrypted data into the blockchain, wherein when the announcement host obtains the disclosure data and the corresponding one-time address, the announcement host garbles a correspondence between the disclosure data and the one-time address to generate a shuffled recognition announcement, and deploys the shuffled recognition announcement on the blockchain, wherein the shuffled recognition announcement comprises the disclosure data and the one-time address between which correspondence is garbled;

wherein the exposing host, the identity confirmation host and the announcement host are connected to each other through a blockchain network as well as comprised a computer readable storage device and one or more integrated circuit chip for executing a plurality of computer instructions stored on the computer readable storage device.

2. The anonymous disclose and many-to-many recognition system based on blockchain and identity confirmation allowance according to claim 1, wherein the one-time address is generated by the exposing host through a hierarchical deterministic wallet based on a main secret key serving as a seed, the identity confirmation host pre-stores a main address or identity data, and when the identity confirmation host completes authentication for the exposing host based on the main address or the identity data and the identity confirmation host receives the one-time address from the exposing host, the identity confirmation host creates a correspondence between the one-time address and the main address or the identity data.

3. The anonymous disclose and many-to-many recognition system based on blockchain and identity confirmation allowance according to claim 1, wherein the valid flag, the receipt flag and the recognition flag are allowed to be recorded in the same smart contract or different blockchain transaction records, and the valid flag and the receipt flag comprise a transaction hash value of the encrypted disclosure data and determination information about whether the decryption is successful, and the recognition flag comprises the one-time address.

4. The anonymous disclose and many-to-many recognition system based on blockchain and identity confirmation allowance according to claim 1, wherein the encrypted data comprises salt data, and when the announcement host loads the encrypted data from the blockchain, the announcement hosts uses an announcement-end private key to decrypt the encrypted data to obtain the disclosure data.

5. The anonymous disclose and many-to-many recognition system based on blockchain and identity confirmation allowance according to claim 1, wherein the disclosure data comprises an identifier configured to allow the exposing host to recognize the self-owned disclosure data based on the identifier when the disclosure data is announced in the shuffled recognition announcement, and when the disclosure data is unrecognized, the announcement host deploys the shuffled recognition announcement again based on all disclosure data having the recognition flags until all pieces of the disclosure data have the corresponding recognition flags.

6. An anonymous disclosure and many-to-many recognition method based on blockchain and identity confirmation allowance, wherein the anonymous disclosure and many-to-many recognition method is applied to a blockchain network comprising a plurality of exposing hosts, an identity confirmation host and an announcement host, and the method comprises:

using the exposing host to transmit a one-time address to the identity confirmation host, and using an announcement-end public key to encrypt disclosure data to generate encrypted data, and deploying the encrypted data based on the one-time address to write the encrypted data into a blockchain;

when the identity confirmation host detects that the encrypted data is written into the blockchain the one-time address, using the identity confirmation host to write a valid flag corresponding to the encrypted data into the blockchain, to prove that the encrypted data is from received the one-time address;

when the announcement host detects presence of the valid flag and the corresponding encrypted data in the blockchain, using the announcement host to load the encrypted data from the blockchain and use an announcement-end private key to decrypt the encrypted data, to obtain the disclosure data and the corresponding one-time address and write a receipt flag corresponding to the encrypted data into the blockchain;

when the announcement host obtains the disclosure data and the corresponding one-time address, using the announcement host to garble a correspondence between the disclosure data and the one-time address, to generate a shuffled recognition announcement, and deploy the shuffled recognition announcement on the blockchain, wherein the shuffled recognition announcement comprises the disclosure data and the one-time address between which the correspondence is garbled; and when each of the plurality of exposing hosts detects presence of the self-owned disclosure data and the one-time address in the shuffled recognition announcement, using each of the plurality of exposing hosts to write a recognition flag into the blockchain based on the self-owned one-time address, to recognize that the self-owned disclosure data exists in the shuffled recognition announcement.

7. The anonymous disclose and many-to-many recognition method based on blockchain and identity confirmation allowance according to claim 6, wherein the one-time address is generated by the exposing host through a hierarchical deterministic wallet based on a main secret key serving as a seed, the identity confirmation host pre-stores a main address or identity data, and when the identity confirmation host completes authentication for the exposing host based on the main address or the identity data and the identity confirmation host receives the one-time address from the exposing host, the identity confirmation host creates a correspondence between the one-time address and the main address or the identity data.

8. The anonymous disclose and many-to-many recognition method based on blockchain and identity confirmation allowance according to claim 6, wherein the valid flag, the receipt flag and the recognition flag are allowed to be recorded in the same smart contract or different blockchain transaction records, and the valid flag and the receipt flag comprise a transaction hash value of the encrypted disclosure data and determination information about whether the decryption is successful, and the recognition flag comprises the one-time address.

9. The anonymous disclose and many-to-many recognition method based on blockchain and identity confirmation allowance according to claim 6, wherein the encrypted data comprises salt data, and when the announcement host loads the encrypted data from the blockchain, the announcement hosts uses an announcement-end private key to decrypt the encrypted data to obtain the disclosure data.

10. The anonymous disclose and many-to-many recognition method based on blockchain and identity confirmation allowance according to claim 6, wherein the disclosure data comprises an identifier configured to allow the exposing host to recognize the self-owned disclosure data based on the identifier when the disclosure data is announced in the shuffled recognition announcement, and when the disclosure data is unrecognized, the announcement host deploys the shuffled recognition announcement again based on all disclosure data having the recognition flags until all pieces of the disclosure data have the corresponding recognition flags.

* * * * *